Sept. 23, 1958     C. E. NOBLES     2,852,974
AIRCRAFT WINDSHIELD PROJECTION SYSTEM
Filed Feb. 23, 1954
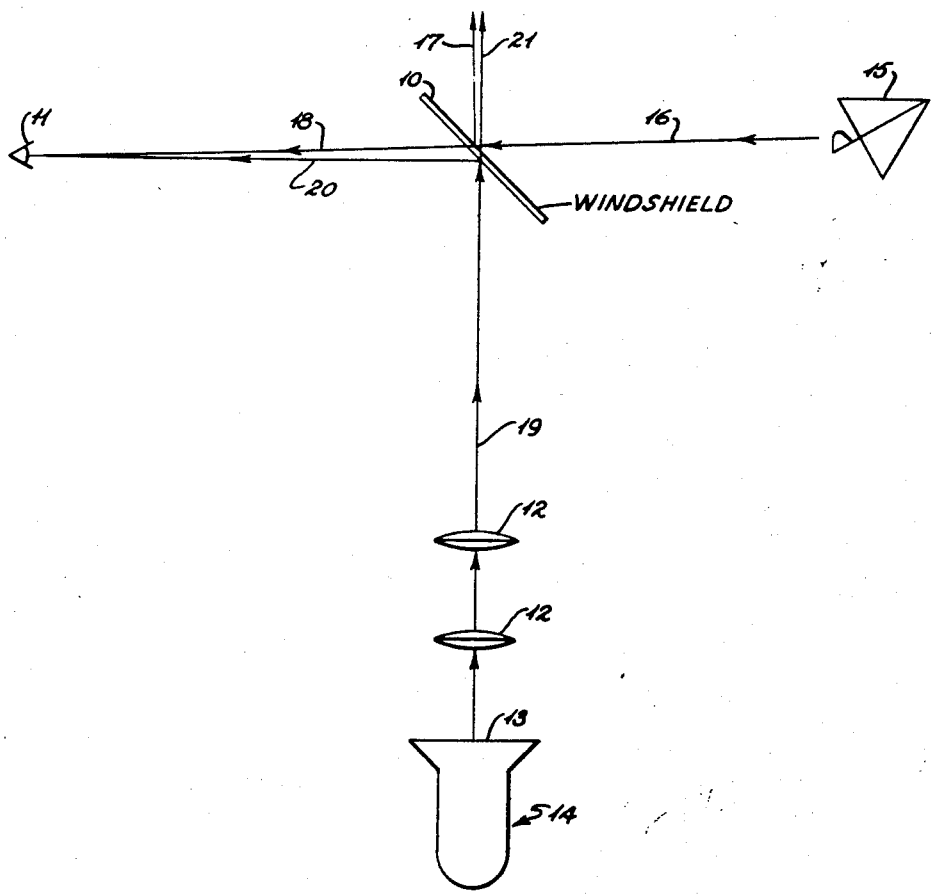
INVENTOR
Charles E. Nobles
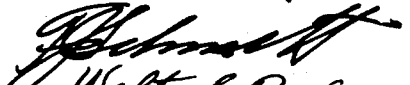
BY Walter S. Paul
ATTORNEYS

United States Patent Office 2,852,974
Patented Sept. 23, 1958

2,852,974

AIRCRAFT WINDSHIELD PROJECTION SYSTEM

Charles E. Nobles, Baltimore, Md., assignor, by mesne assignments, to the United States of America as represented by the Secretary of the Navy Application February 23, 1954, Serial No. 412,132

1 Claim. (Cl. 88—1)

This invention relates to an aircraft windshield projection system which permits the simultaneous visual and radar tracking of a target.

Generally, this invention provides an optical system which will project radar information onto the windshield of an aircraft so that an operator will see a target and the radar firing information simultaneously.

A problem encountered in providing such a projection arises from the fact that, generally, light intensities emanating from a target are much greater than the projected information from the radar scope, and the projection is, therefore, effectively "washed out." It is, therefore, an object of this invention to eliminate the "washing out" of the projected information, by providing a color separation means to produce a visible projected radar image on the windshield under conditions of high outside illumination.

It is a more specific object of this invention to project radar information onto the windshield of an aircraft, and to provide means whereby the projected images and the target will both be clearly visible to an operator.

Another object is the provision of a dichroic mirror for the windshield of an aircraft, so that certain light rays will pass through said windshield, while others are reflected.

Other and more specific objects of this invention will become apparent upon a careful consideration of the following detailed description and the appended claims, taken in connection with the single figure of the drawing in which a simplified schematic arrangement of a preferred embodiment of this invention has been illustrated.

Referring to the drawing, the numeral 10 indicates the windshield of an aircraft, while the numeral 11 indicates the approximate position of the eye of an operator. The windshield 10 is a dichroic mirror, having the property of being able to pass certain light colors, while reflecting others. The windshield may be designed to reflect any one of the basic light colors, although it may be preferred to reflect red in most applications.

A series of lenses 12 are arranged to focus the images appearing on the screen 13 of a cathode ray tube 14 at infinity, and to project the images on the windshield 10. The images on the screen 13 are, of course, radar representations on a target 15 which is being tracked by the operator.

Assuming that the dichroic mirror for the windshield 10 has been designed to reflect the light color red, only, it is seen that although the light rays 16 emanating from the target 15 will contain all colors, the red component 17 will be reflected at the windshield 10, while the remaining components 18 pass through to the operator 11. It is also seen that the light rays 19 from the cathode ray screen 13 contain all the color components, but that only the red components 20, are reflected towards the operator, while the remaining components 21 are permitted to pass through the windshield 10.

It is to be understood, that although the light components 18 and 20, and 17 and 21 have been illustrated as separated, in actual practice, an effort is made to adjust the lenses 12 to provide for the intersection of the target image and the screen image at the windshield 10. It is apparent, therefore, that the operator will simultaneously observe the target 15 and the image on the screen 13, thus permitting simultaneous visual tracking while receiving radar information.

It is obvious that many modifications and variations of this invention will become readily apparent to those skilled in the art. It is the intent, therefore, that this invention be limited only by the state of the prior art, and by the scope of the appended claims.

Having thus described the invention, what is claimed is:

An optical system for aircraft for simultaneously observing a target and a radar image thereof comprising, a windshield disposed at an angle to the line of sight to said target for said aircraft, said windshield comprising a dichroic semi-transparent mirror for selectively reflecting light rays of a certain color and permitting light rays of other colors to pass therethrough whereby said target may be observed therethrough, a cathode ray tube having a screen for projecting an image of said target in said certain color on said windshield, the normal of said screen being perpendicular to the line of sight, an optical lens system interposed between said screen and said windshield for focusing said image at infinity whereby the reflection of said image on said windshield and the view of said target through said windshield may be observed in substantially the same focus and the image of said cathode ray tube is readily distinguishable from said target.

References Cited in the file of this patent

UNITED STATES PATENTS

| | | |
|---|---|---|
| 1,871,877 | Buckman | Aug. 16, 1932 |
| 2,251,984 | Cleaver et al. | Aug. 12, 1941 |
| 2,392,978 | Dimmick | Jan. 15, 1946 |
| 2,426,184 | Deloraine et al. | Aug. 26, 1947 |
| 2,537,996 | Hankes | Jan. 16, 1951 |
| 2,579,806 | Dvorkin | Dec. 25, 1951 |
| 2,589,930 | Dimmick et al. | Mar. 18, 1952 |
| 2,633,051 | Davis | Mar. 13, 1953 |
| 2,750,833 | Gross | June 19, 1956 |